J. E. BOEGEN.
STEAM, AIR, AND WATER TRAP VALVE.
APPLICATION FILED SEPT. 29, 1908.
959,297.
Patented May 24, 1910.
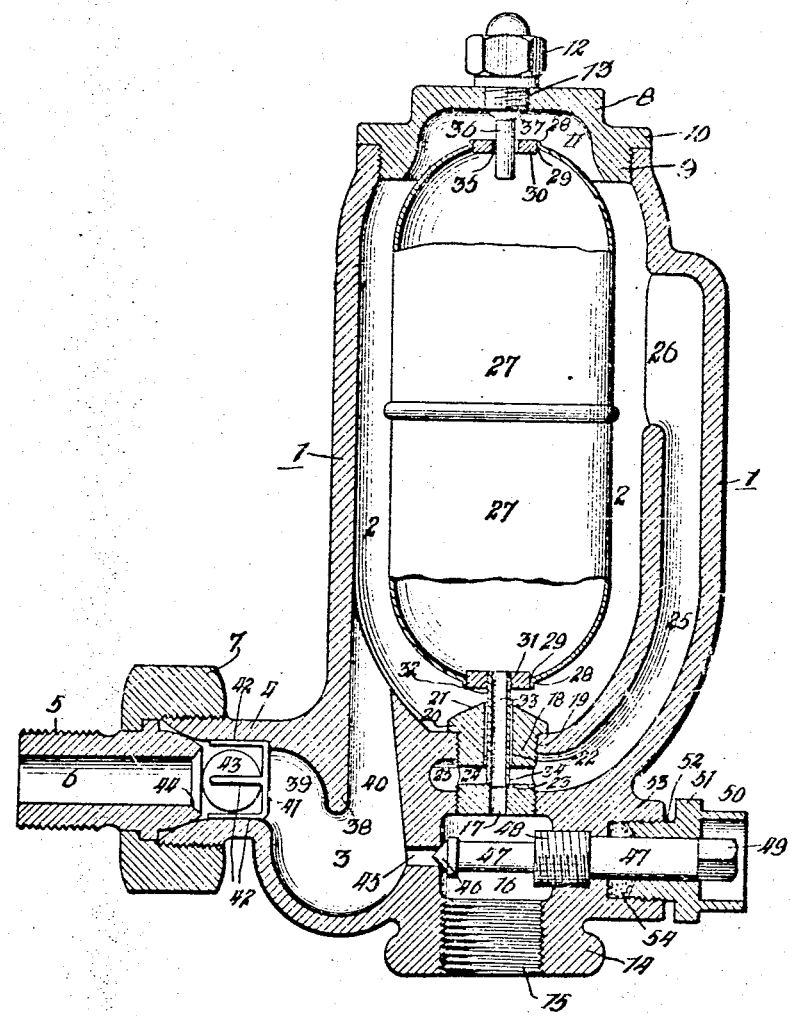
Witnesses:
Inventor:
John E. Boegen

UNITED STATES PATENT OFFICE.

JOHN E. BOEGEN, OF BERWYN, ILLINOIS, ASSIGNOR TO CHARLES P. MONASH, OF CHICAGO, ILLINOIS.

STEAM, AIR, AND WATER TRAP VALVE.

959,297.  Specification of Letters Patent.  Patented May 24, 1910.

Application filed September 29, 1908.  Serial No. 455,385.

*To all whom it may concern:*

Be it known that I, JOHN E. BOEGEN, a citizen of the United States, residing at Berwyn, in the county of Cook and State of Illinois, have invented a certain new and useful Improvement in Steam, Air, and Water Trap Valves, of which the following is a specification.

This invention relates to trap valves more particularly adapted for use with steam heating systems by attachment to a radiator or heating coil, for automatically discharging water of condensation, but can also be used as a trap valve in discharging liquids and mediums of various kinds, and this without any particular attention from an operator, when the trap valve is once adjusted for use.

The objects of the invention are to construct a trap valve consisting of a casing having a chamber, with a float located in the chamber and adapted to be elevated with the rise of the water of condensation or other medium in the chamber, the chamber having an inlet passage for the water of condensation or other medium, and an outlet passage the mouth of which opens into the chamber at a point approximately in line with the longitudinal center of the float when at rest or in normal position, and the float having an inlet at its upper end and an outlet at its lower end for escaping air as the water of condensation, or other medium, rises in the float chamber; to construct a trap valve having a float controlling the discharge of water of condensation, or other medium, the float having, at the upper end, a free passage for air, which passage surrounds a guide stem and is opened and closed by a valve seat on the stem, as the float is lowered and raised by the water of condensation, or other medium, and the float having, at the lower end, a passage for educting air from the interior of the float in the operation of the trap valve; to furnish a free passage for inducting air from a float chamber into a float at the upper end, said passage controlled by a valve, and to furnish a passage for educting air from the interior of the float; and to improve generally the construction and operation of the several elements entering into the trap valve as a whole.

The invention consists in the features of construction and combination of parts hereinafter described and pointed out in the claims as new.

In the drawings the figure is a sectional elevation of the trap valve of the present invention, with the float partly in full elevation and in its normal or seated position.

The trap valve of the present invention has a shell or casing 1 inclosing a chamber 2, which casing is open at the top and closed at the bottom, except in having a discharge passage for the water of condensation, formed in the chamber 2 of the casing, or for the discharge of other liquid or medium from the chamber. An inlet passage 3 formed in a neck 4 of the shell or casing opens into the chamber 2 adjacent to the bottom of the chamber; and connecting with the neck 4 is a union nipple 5 having a passage 6 which opens into the passage 3; and the union nipple is connected to the neck by a nipple nut 7, as usual.

The open upper end of the shell or casing 1 is closed by a cap 8, having a depending rim or flange 9 with an exterior screw thread by which the cap is threaded into the end of the shell or casing, and when in place a flange 10 on the cap abuts against the end face of the shell or casing, so as to make a tight joint between the cap and the shell or casing. The cap 8, on its under side, as shown, is formed with a chamber or cavity 11, to permit of the operation of the float. A plug 12 is threaded into the cap 8 at the center, and this plug has a threaded end for entering and securing the plug in position.

The lower end of the shell or casing 1 has formed therewith a neck or boss 14, having a threaded hole 15 for the attachment of a discharge or vacuum pipe in the use of the trap valve. The threaded hole 15 opens into a chamber 16, and a port 17 opens into the chamber 16, which port 17, in the construction shown, is formed in a plug 18 threaded into a hole 19, formed in the bottom wall of the shell or casing 1, as shown. The plug 18, as shown, has a flange or rim 20 to fit closely against the inner face of the bottom wall of the shell or casing 1, and the upper face 21 of the plug 18, in the construction shown, is tapered or inclined so as to prevent accumulation of sediment that would interfere with the operation of the float. The plug 18 has a central passage or hole 22 extending to the port 17, and terminating in a seating face 23 around the port; and, leading into the passage or hole 22, is a cross passage 24 forming, with the passage or hole 22, and port 17, a discharge passage for the water of condensation, or other liquid or medium. The lateral or cross passage 24 is in communication with an outlet passage 25 formed in the wall of the shell or casing 1, and having, at its upper end, a mouth 26 opening into the chamber 2 of the shell or casing; and the lowermost point of the mouth 26 is in line, or approximately so, with the center longitudinally of the chamber, and is located in such relation to the rise of the water, or other liquid or medium in the chamber, that any oil, or light sediment or material, on top of the water, or other liquid or medium will first flow into the outlet passage, and this prior to the time the float is elevated, so as to open the discharge passage leading into the discharge chamber 16, thereby removing oil, sediment and light material floating on the surface of the water, or other liquid or medium prior to the flow of a free discharge of the water, or liquid, or medium from the chamber 2, thus maintaining the chamber 2 clear of oil and any floating sediment, or material which would be liable to accumulate in the chamber and interfere with the perfect operation of the float.

The float 27, in the form shown, is made in two halves or sections of thin material, joined at the center by overlapping beads so as to be practically air tight. Each end of the float has an outwardly turned rim 28 encircling a hole or opening 29; and the opening 29, for the upper end of the float, has secured therein a plug or reinforcement 30, and the lower end of the float, in the opening 29, has secured therein a plug or reinforcement 31, depending from which is a tube 32 having a passage 33 and furnishing a guide for the lower end of the float and a discharge for air from the interior of the float. The tube 32 has, on its lower end, a seating face 34 which co-acts with the seat 23 around the port 17 and closes the discharge passage into the chamber 16 when the float is down or in normal position, as shown in the figure; and with the rising of the float the stem 32 is also raised, opening the port 17 and allowing the oil, floatage and water in the chamber 2 and passage 25 to discharge into the chamber 16 for removal through the discharge or vacuum pipe, as usual.

The reinforcement or plug 30, at the upper end of the float, has a central hole 35, into which is entered a fixed pin 36 of a less diameter than the hole 35, so as to leave a free passage around the pin for admitting air from the chamber 2 into the interior of the float, as the water of condensation, or liquid or medium, rises in the float chamber. The guide pin 36 depends from the plug 12, and the plug 12, on the under side of the screw threaded portion 13 thereof, has a seating face 37, which, when the float is completely raised, closes the opening or passage 35 and prevents air from flowing into the interior of the float from the float chamber, and at the same time the discharge passage in the plug 18 is open for escaping water of condensation, or other liquid or medium in the passage 25, until the amount of escape is sufficient to allow the float to fall or return to its normal position, as shown in the figure.

The wall 1, in the arrangement shown, has, at its lower end, an abutment 38, which enters into the chamber 3, forming a U shaped passage with a leg 39, and a leg 40; and the leg 40 opens into the float chamber 2 at a point below the lower end of the float, when in normal position, as shown in the figure. The leg 39 of the U shaped passage has entered into its receiving end a cage 41 having lateral arms 42, with openings between the arms, which cage supports a ball valve 43, held in place by the arms or legs 42; and the ball valve 43 co-acts with a valve seat 44 formed on the end of the union nipple 5 around the end of the passage 6 in said nipple. It will be understood that when the vacuum is operating correctly the ball valve will be forced away from the seat 44, so as to furnish open communication into the inlet passage 3 for the water of condensation, or other liquid or medium, to flow into the lower end of the float chamber and rise in such chamber; but in the event of back pressure, or failure of the vacuum to operate, the ball valve 43 will be forced against its seat 44, closing communication into the passage 3, and shutting off the flow of water of condensation into the chamber 2 of the float.

The wall of the chamber 16, on one side, has a by-pass 45, with a seating face with which a seating end 46 coacts; and the seating end 46 is on a stem 47, having a screw threaded portion 48 entered into the wall of the chamber 16, so that by advancing and receding the stem 47, through the screw threaded portion 48, the end 46 can be seated to close the by-pass 45, or unseated to open the by-pass 45 and allow the water of condensation to flow from the passage 3 directly into the discharge chamber 16 without entering the float chamber. The stem 47, as shown, has a squared end 49 for receiving a turnkey, or other instrument, for operating the stem; and the end 49 is surrounded by a wall 50 outwardly extending from a flange 51 on a closing plug 52, which plug is entered into a rim or wall 53 at the lower end of the main shell or casing; and, as shown, a packing 54 is located in advance of the plug 52 to be compressed by the plug and furnish a tight joint around the stem.

The operation briefly is as follows: The water of condensation, or other liquid or medium, entering the passage 3 from the radiator, or other source of supply, flows upwardly through the leg 40 into the bottom of the float chamber and gradually rises in the chamber, and when the upper surface of the water of condensation, or other medium, reaches the lowermost point of the mouth 26, any oil, sediment, or light material floating on the surface of the water of condensation, or other liquid or medium, will flow into the passage 25 before the water of condensation, or other liquid, freely enters such passage, and with the continued rise of the water of condensation to a point that will overcome the weight of the float, the float will be elevated, opening the discharge passage into the chamber 16 and allowing the free escape of oil, water and sediment from the passage 25. The air in the float chamber, as the water of condensation rises therein, with the float down, will enter the interior of the float freely and in an unrestricted manner through the passage 35, and the air thus inducted into the interior of the float will be educted therefrom through the passage 35 of the guide tube 32, thus educting air from the float chamber as the water of condensation, or other liquid or medium, rises in the float chamber; and with the elevation of the float the passage 35 will be closed by the seating face 37, preventing the escape of air from the float chamber into the interior of the float. The operation of the trap valve, in eliminating air and discharging water of condensation, or other liquid or medium, from the chamber 2, will be automatically performed after the trap valve is in position, making the operation of the trap valve automatic in caring for the air and water of condensation, or other liquid or medium.

What I regard as new and desire to secure by Letters Patent is:

1. In a steam, air and water trap valve, the combination of a casing inclosing a chamber, the casing having an inlet passage for water of condensation to enter the chamber, and having in its side and bottom wall a downwardly and inwardly extending conduit for escaping water of condensation from the chamber, the inlet end of the conduit opening into the chamber with its under side in a plane below the line of flotation of a float in the chamber and having its terminal end below the chamber, a hollow float operative within the chamber of the casing and having at its upper end an unrestricted passage, furnishing, when the float is in normal position, free communication between the interior of the float and the float chamber for educting air from the chamber of the casing into the interior of the float, and a guide tube depending from the lower end of and in communication with the interior of the float, for educting air from the interior of the float and discharging the educted air below the terminal end of the side conduit, said guide tube serving as a closure for the discharge end of the downwardly and inwardly extending conduit, substantially as described.

2. In a steam, air and water trap valve, the combination of a casing inclosing a chamber, the casing having an inlet passage for water of condensation to enter the chamber, and having in its side and bottom wall a downwardly and inwardly extending passage for water of condensation to escape from the chamber, said side passage having its inlet end opening into the chamber with its under side in a plane below the line of flotation of a float in the chamber and having its terminal end below the chamber, a hollow float in the chamber, the float having a passage at the upper end, furnishing, when the float is in normal position, free and unrestricted communication between the interior of the float and the chamber of the casing, a solid guide pin having a fixed position and entering into the air passage of the upper end of the float and having a seating face for closing the air passage when the float is raised, and stopping the educting of air from the chamber of the casing, a guide tube entered into the lower end of and communicating with the interior of the float for educting air from the interior of the float and discharging the educted air below the terminal end of the water discharge passage, the guide tube also having a seating face for closing the terminal end of the water discharge passage for the water of condensation from the chamber of the casing, substantially as described.

3. In a steam, air and water trap valve, the combination of a casing inclosing a float chamber, the casing having an inlet passage for water of condensation to enter the chamber and leading into the chamber at the bottom, and having in its side and bottom wall a downwardly and inwardly extending passage for escaping water of condensation from the float chamber, said side passage having its inlet end opening into the chamber with its under side in a plane below the line of flotation of a float in the chamber and having its terminal end below the chamber, a plug in the bottom wall of the casing, the plug having a lateral discharge passage and port leading therefrom into a discharge chamber in the bottom wall of the casing, said lateral passage and its port and the downwardly and inwardly extending side passage having communication with each other for discharging the water of condensation from the float chamber, a float within the float chamber, the float having at its upper end an unrestricted passage in its end wall, furnishing, when the float is in normal position, means for educting air from the chamber of the casing into the interior of the float, a solid guide pin having a fixed position and entered into the air passage at the upper end of the float and having a seating face for closing the air passage, when the float is raised, and stopping the educting of air from the chamber of the casing, and a guide tube at the lower end of and in communication with the interior of the float for educting air from the interior of the float and discharging the educted air below the terminal end of the water discharge passage, the guide tube also having a seating face for closing the port of the water discharge passage, substantially as described.

4. In a steam, air and water trap valve, the combination of a casing inclosing a float chamber, the casing having in its lower end an air and liquid discharge passage and having in its side wall a liquid discharge passage leading from the float chamber in a plane adjacent to the horizontal line of flotation of a float in the float chamber, and the casing having also a conduit adapted to provide communication between a radiator and said float chamber and arranged to be sealed by accumulation of water of condensation in the conduit and the float chamber, a hollow float operating within the float chamber and having at its upper end a guide opening, a guide pin extending downward from the top wall of the float and passing loosely through the guide opening of the float, and a hollow valve piece on the lower end of the float for controlling the liquid discharge passage, said valve piece affording communication between the interior of the hollow float and the air and liquid discharge passage of the lower end of the casing, whereby an air discharge passage is provided through the guide opening of the float, the hollow float and the hollow valve piece, substantially as described.

5. In a steam, air and water trap valve, the combination of a casing inclosing a float chamber, the casing having a liquid discharge passage leading from the float chamber in a plane adjacent to the horizontal line of flotation of a float in the float chamber, and the casing having also a conduit adapted to provide communication between a radiator and said float chamber, a hollow float operating within the float chamber and having at its upper end a guide opening, a guide pin depending from the upper wall of the casing and passing loosely through the guide opening of the float, a hollow seating plug entered into the bottom wall of the float chamber and having a port communicating with the liquid discharge passage from the float chamber, and a hollow valve piece on the lower end of the float for controlling the liquid discharge passage from the float chamber, said valve piece affording communication between the interior of the float and the port of the seating plug, whereby an air discharge passage is provided through the guide opening of the float, the hollow float, the hollow valve piece and the port of the seating plug, substantially as described.

JOHN E. BOEGEN.

Witnesses:
OSCAR W. BOND,
WALKER BANNING.